Patented Feb. 17, 1942

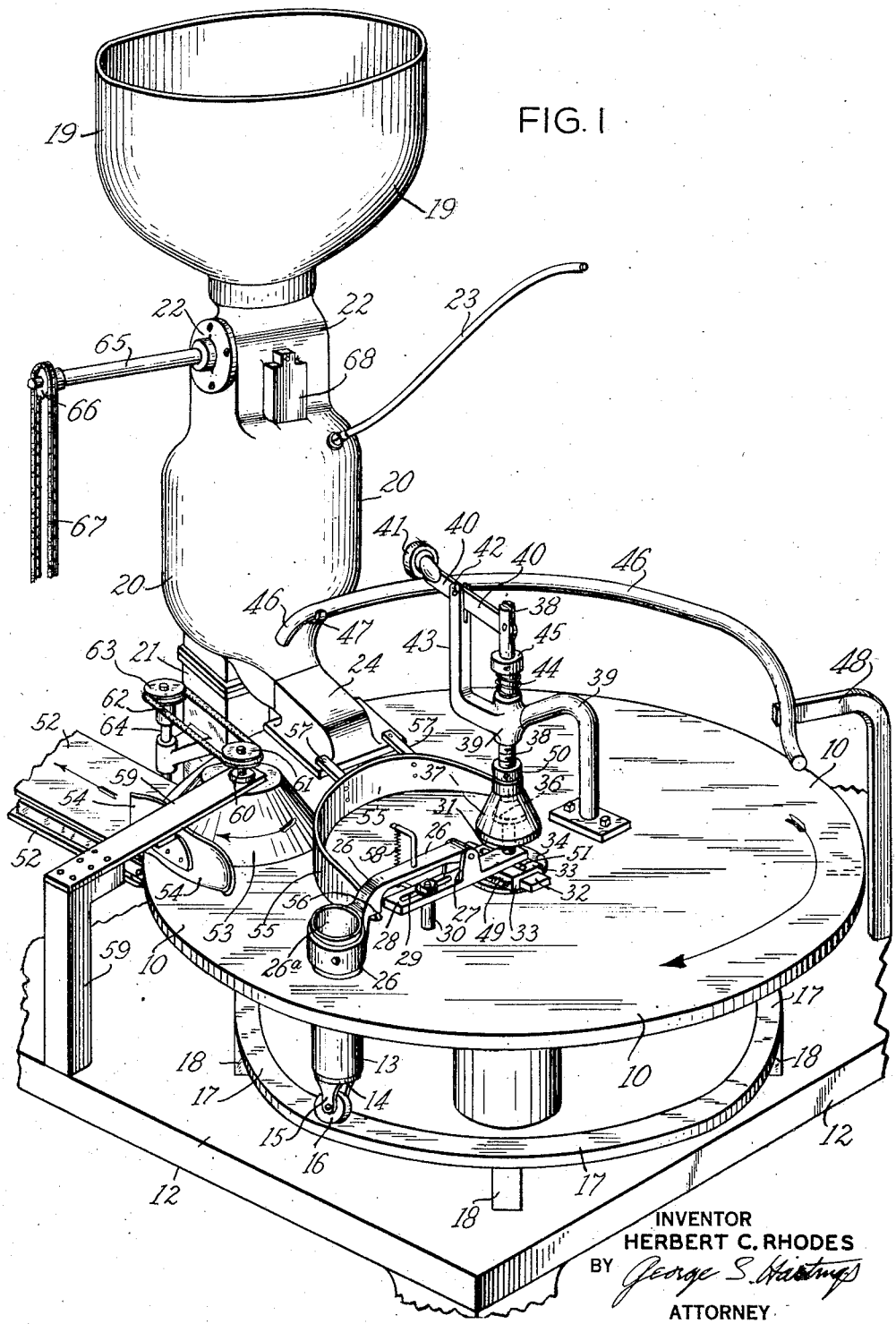
Feb. 17, 1942.  H. C. RHODES  2,273,219
DOUGH-MOLDING MACHINE
Filed Jan. 27, 1940  2 Sheets-Sheet 1
FIG. I
INVENTOR
HERBERT C. RHODES
BY George S. Hastings
ATTORNEY

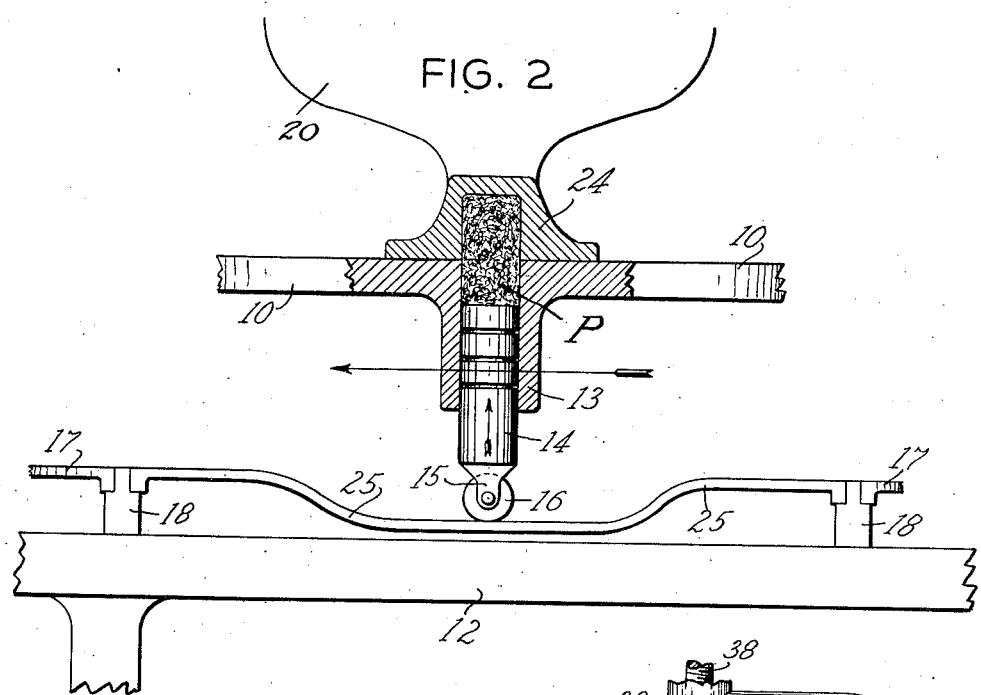
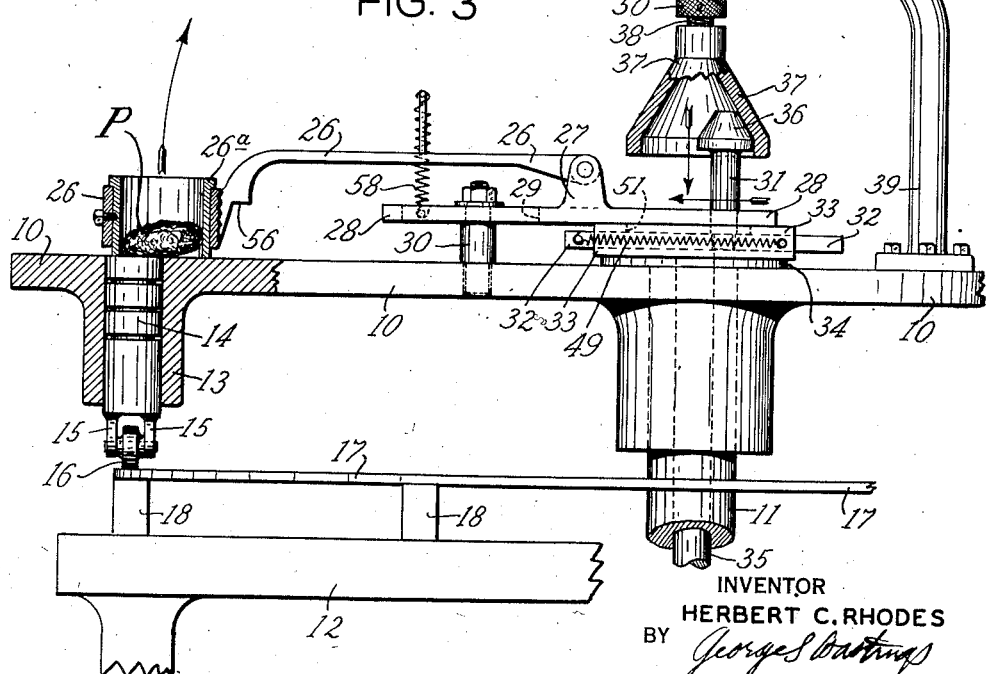

2,273,219

UNITED STATES PATENT OFFICE 2,273,219

DOUGH-MOLDING MACHINE

Herbert C. Rhodes, Portland, Oreg.

Application January 27, 1940, Serial No. 315,879

6 Claims. (Cl. 107—9)

My invention has for its purpose the providing of an efficient dough-measuring and molding machine of simple construction.

According to my invention I provide a smooth top, rotated molding table in which is provided a cylindrical depression constituting a measuring pocket filled from a hopper. The hopper has a nozzle which bears on the table top, said nozzle being adapted to fill said measuring pocket, under the influence of pressure introduced in the hopper, when the nozzle registers with said measuring pocket; and said nozzle is closed and thus extrusion of dough therefrom is restrained at all other times. In said measuring pocket is a piston which is adapted to be pushed down to a predetermined extent by the pressure of the dough extruded from said nozzle, and the piston is then moved up by suitable means to bring its upper end flush with the top of the table; by so doing expelling the dough from the measuring pocket onto the table top. The piece of dough is then immediately encompassed by a ring-like molding cup, having straight vertical inner sides, and the molding cup is oscillated on the table top over said piston by suitable means actuated by the rotation of the table, and adjustable to vary the degree of oscillation imparted to the dough-molding cup.

Because of the top of the molding table being smooth the dough does not adhere to it. But the pressing of the dough fed into the measuring pocket down onto the top of the piston causes the dough to adhere sufficiently to the top of the piston so that when the dough piece is raised to the top of the molding table the dough piece will be rolled and molded by the oscillation of the dough molding cup over the piston top.

Dusting of flour on the dough piece is eliminated.

Means are provided by which during the further rotation of the molding table the molding cup is lifted off the table top, thus releasing the piece of molded dough, which is then removed from the table top by suitable means carrying the molded piece to other devices for further treatment. Furthermore the cooperating devices embraced in my machine are adjustable to handle various kinds of dough and sizes of dough pieces.

The details of construction and of operation and the special features of my molding machine are hereinafter fully described with reference to the accompanying drawings.

Fig. 1 is a perspective view of my machine;

Fig. 2 is a detail sectional side elevation illustrating the feeding of the dough into the dough measuring pocket of my machine; and Fig. 3 is also a detail sectional side elevation illustrating the rounding mechanisms and their action.

With reference to the drawings, my machine consists of a constantly rotated molding table 10 having a hub mounted on a vertical hollow shaft 11 (Fig. 3) supported in suitable bearings of a bed 12. Shaft 11 may be driven through a standard variable speed drive (not shown) connected with the main drive of the machine and therefore can be rotated at any suitable or desired speed.

The molding table 10 is provided with a measuring pocket 13 wherein is slidably mounted a piston 14, the projecting lower end of which is equipped with a forked lug 15 to which is pivoted a roller 16 riding on a circular cam track 17 fastened to lugs 18 of the bed 12. While in the accompanying drawings only one measuring pocket 13 is shown, the machine may be equipped with a plurality of the same each having its own piston 14.

The dough is deposited in an open hopper 19 (Fig. 1) which is mounted on the upper end of an upright pressure chamber 20 secured to bracket 21 attached to the bed 12. The pressure chamber 20 is provided with a rotary feeding valve 22 which is of a construction similar to that disclosed in my Patent application S. N. 271,269, filed May 2, 1939, and issued November 12, 1940, as Patent No. 2,221,327, for Pneumatic dough feeder. The rotary valve 22 has the function of feeding the dough from hopper 19 into the pressure chamber 20 which is connected by a suitable pipe or hose 23 to an air compressor (not shown) of well known construction. To the lower portion of pressure chamber 20 is attached a feed nozzle 24 (Figs. 1 and 2) whose outlet faces the top of the rotating table 10. While the measuring pocket 13 moves across the outlet of the nozzle, the dough under pressure in chamber 20 and nozzle 24 forces the piston 14 down into and fills the upper portion of said pocket 13 (Fig. 2). The downward movement of piston 14 is checked when its roller 16 contacts the downwardly bowed section 25 of cam track 17 (Fig. 2). The shape of the downwardly bowed section 25 therefore controls the displacement of the piston in the measuring pocket 13 and the amount of dough admitted to the latter. For this reason, section 25 of track 17 is interchangeable with other sections which are bowed to a greater or lesser extent to permit the separation of different weights of dough pieces P from the dough extruded through the nozzle 24 during the passage of the measuring pocket 13 thereunder. The nozzle 24 being secured to pressure chamber 20 and remains stationary during the filling of the pocket 13.

During the travel of measuring pocket 13 over the higher level section 25 of track 17, the piston 14 is moved up in said pocket, thus bringing its upper end flush with the upper face of the rotated table 10 and thus expelling the dough piece received in the pocket 13; and the piston 14 is lowered by the pressure of the dough extruded from the nozzle 24 during the travel of measuring pocket 13 over the lower level section of track 17, thus causing the measuring pocket 13 to become filled with another measured quantity of dough from nozzle 24.

The outlet of nozzle 24 constantly bears firmly on the top of rotated table 10 such top being smooth. The dough in the outlet of nozzle 24 is thus restrained against extrusion until such outlet registers with the measuring pocket 13, which is thereby filled with a measured quantity of dough from said nozzle.

When the top of piston 14 rises to the top of rotated table 10, thus expelling the dough filling the measuring pocket 13 on the table, the expelled dough piece P is immediately encompassed by a molding cup 26a which is held and moved over the dough piece by an arm 26. This arm is hinged on a pair of lugs 27 of an oscillating bar 28. One end of said oscillated bar is provided with a slot 29 (Figs. 1 and 3) in which bears the neck of a vertical stud 30 set in the rotating table 10. The other end of said oscillated bar 28 is loosely mounted on a vertical control stud or crank pin 31 mounted on a bar 32 which is slidably supported within a guide housing 33 rigidly attached to a disk 34 fastened to and driven by a vertical shaft 35 (Fig. 3) supported by hollow shaft 11, the pin 31 projecting through a slot in the upper face of guide housing 33. Said shaft 35 may be connected to a standard variable speed drive mechanism or be driven by a set of ordinary step pulleys (not shown). The control stud or crank pin 31 on its free upper end is provided with a solid cone head 36 (Figs. 1 and 3) which engages with the inner face of a hollow control cone 37, the latter being mounted on a vertical shaft 38 slidably supported by a bearing bracket 39 secured to the table 10. To the upper end of shaft 38 is pivoted one end of a lever 40 whose free end carries a roller 41 (Fig. 1). The lever 40 is supported intermediate its ends by a stud 42 held by a bearing arm 43 of bracket 39 mounted on table 10. Shaft 38 furthermore is provided with a compression spring 44 urging upwardly a collar 45 on shaft 38 for the purpose of keeping control cone 37 in a raised position at all times, except when downward movement of shaft 38 and control cone 37 is permitted by the lower end portion of cam rail 46 whereon the roller 41 of lever 40 rides. Cam rail 46 is supported by a hook 47 attached to pressure chamber 20 and a supporting arm 48 fastened to the main frame 12 of the machine. Since slidable bar 32, which carries the crank stud pin 31, and guide housing 33 are connected by a tension spring 49, therefore cone head 36 of pin 31 is yieldingly held in contact with the inner face of the hollow control cone 37 and any up or down movement of the latter will cause pin 31 to move away from or towards the center of said control cone 37 which coincides with the center of rotation of table 10.

Hence the molding arm 26 and therewith the molding cup 26a are oscillated when the center of crank-pin 31 is displaced—that is moved out of coincidence with the center of rotation of table 10. The degree of oscillation will be relative to said displacement, and the oscillation ceases when the centers of the crank-pin 31 and of rotation of table 10 coincide.

In order to regulate or check the upward stroke of shaft 38 and thereby control the stroke of the oscillated bar 28, shaft 38 is provided with an adjustable threaded stop collar 50. The top portion of guide housing 33 is provided with a suitable slot 51 through which stud 31 projects from bar 32 as above described. The eccentric motion of stud 31 at one end of bar 28 in combination with the restraint of the stationary guide stud 30 at the other end creates a gyrating motion which is transmitted through the rounder arm 26 to the molding cup 26a. As mentioned said molding cup 26a encircles the dough piece P, which has been lifted up into alignment with the surface of table 10 by piston 14, and said dough piece is moved around on top of said piston by the gyrating motion of molding cup 26a. In accordance with the type of dough to be rounded, the speed of the gyrating motion is controlled by the variable speed drive, (not shown) of shaft 35 and the stroke or sweep of the rounder arm can be suitably adjusted by limiting the upward movement of the conical cylinder 37.

The duration of the rounding operation is controlled by the speed of rotation of molding table 10. In order to accommodate smaller or larger dough pieces, the molding cups 26a can be replaced by larger or smaller ones, if desired, and the detachability of said cups also facilitates the cleaning of same. When the rounding and molding action upon the dough piece P is completed the dough piece P is transferred from the rotated table 10 on to an endless belt conveyor 52 (Fig. 1) for panning. The dough piece P is moved off the top of the piston 14 and table 10 by a constantly rotating dough discharging cone 53. When the molding cup 26a has ceased its gyrating motion it is raised to permit transfer of said dough piece. The raising of cup 26a is accomplished by a guide bracket 55 placed in the path of the rounder arm 26 which is provided with a contact surface 56 riding upon the upper edge of bracket 55 during the rotation of table 10. Bracket 55 is fastened and held stationary by its lugs 57 to the nozzle 24. The rounder arm 26 travels with the rotating table in raised position until it reaches a new dough piece brought to the upper surface of table 10 by piston 14. The cup 26a then encircles the dough piece and commences its gyrating and rounding motion anew. In order to assure good contact of the mold cup 26a with the table 10, the tension spring 58 is provided. In accordance with the stiffness and density of the dough, the inner surface of the interchangeable cups may vary in degree of roughness to increase or decrease the amount of friction necessary in the rounding action. The dough pieces discharging cone 53 is supported by a suitable bracket 59 (Fig. 1) mounted on main frame 12, said rotating cone 53 being constantly driven by a vertical shaft 60 carrying pulley 61 driven through a belt 62 by a pulley 63 mounted on a vertical shaft 64 connected to the main drive of the machine. The rotary feeding valve 22 in the upper portion of pressure chamber 20 is driven by a shaft 65 carrying a sprocket 66 which is operated through sprocket chain 67 actuated by suitable driving means of the main drive of the machine. In order to prevent over-feeding of pressure chamber 20 the latter is equipped with a level control switch mechanism of similar construction to that disclosed in the abovementioned Rhodes' application S. N. 271,269, May 2, 1939. Said lever control mechanism is supported in a housing 68 attached to the upper portion of chamber 20.

In the operation of the machine the dough extruded from nozzle 24 into the measuring pocket 13 is elevated to the top of the table by the ascent of the piston 14 is already mentioned.

The operation of my machine will be understood from the description above given. The above-described cooperating devices of my machine include any substitute devices capable of operating in accordance with the principles of my invention.

What is claimed is:

1. The combination of a rotary carrier having a measuring pocket, a dough hopper provided with a nozzle adapted to extrude dough into said pocket, a piston within said pocket adapted to eject the dough therefrom, a molding cup movable with said carrier adapted to round the ejected dough on said piston, and mechanism for raising said molding cup after its rounding operation is completed, to clear said nozzle.

2. The combination with a traveling member arranged to support dough pieces and having a dough receiving and measuring pocket, of means for ejecting the dough from the pocket, and gyratory molding means coacting with said ejecting means and operating to mold the piece of dough ejected from said pocket while supported by said ejecting means.

3. In a dough-molding machine, the combination of a rotary table having a measuring pocket, and a dough hopper adapted to feed dough into said pocket, a piston reciprocable in said pocket, a cam track cooperating with and adapted to cause said piston to move in an upward direction, and said track having a downwardly-bowed section to limit the extent of movement of the piston in a downward direction during the filling of said measuring pocket, a molding cup pivotally and slidably mounted on said table for rounding the dough on said piston, means for oscillating said molding cup, including a rotary crank-pin having a cone-head, a vertically movable hollow-cone mounted on said table, means holding the cone-head of said crank-pin in yielding contact with said hollow-cone, and automatic means, coacting with the rotation of said table, for lowering said hollow-cone on said crank-pin to control the oscillation of said molding cup.

4. The combination described by claim 1 in which the hopper is provided with a nozzle normally held down on the rotary table and including means for raising the molding cup after its rounding operation is completed, in order to clear said nozzle.

5. A dough-molding machine comprising a rotary table having a measuring pocket, a dough hopper having a nozzle bearing on said rotary table and adapted to extrude dough into said pocket when registering therewith, a piston reciprocable in said pocket, a cam track cooperating with and adapted to cause said piston to move in an upward direction, and said track having a downwardly-bowed section to limit the extent of movement of the piston in a downward direction during the filling of said measuring pocket, a molding cup pivotally and slidably mounted on said table for rounding the dough on said piston, means for oscillating said molding cup, including a rotary crank-pin having a cone-head, a vertically movable hollow-cone mounted on said table, means holding the cone-head of said crank-pin in yielding contact with said hollow-cone, automatic means, coacting with the rotation of said table, for lowering said hollow-cone on said crank-pin to control the oscillation of said molding cup, and means normally holding the molding cup firmly on said table, mechanism for raising said molding cup, after completing its rounding operation, to clear said nozzle.

6. A dough-molding machine comprising a rotary table having a measuring pocket, a dough hopper having a nozzle bearing on said rotary table and adapted to extrude dough into said pocket when registering therewith, a piston reciprocable in said pocket, a cam track cooperating with and adapted to cause said piston to move in an upward direction, and said track having a downwardly-bowed section to limit the extent of movement of the piston in a downward direction during the filling of said measuring pocket, a molding cup pivotally and slidably mounted on said table for rounding the dough on said piston, means for oscillating said molding cup, including a rotary crank-pin having a cone-head, a vertically movable hollow-cone mounted on said table, means holding the cone-head of said crank-pin in yielding contact with said hollow-cone, automatic means, coacting with the rotation of said table, for lowering said hollow-cone on said crank-pin to control the oscillation of said molding cup, means normally holding the molding cup firmly on said table, mechanism for raising said molding cup, after completing its rounding operation, to clear said nozzle, and means then removing the molded dough from said table.

HERBERT C. RHODES.